US006302142B1

(12) United States Patent
Behrens

(10) Patent No.: US 6,302,142 B1
(45) Date of Patent: Oct. 16, 2001

(54) SUPERSONIC GAS FLOW DEVICE INCORPORATING A COMPACT SUPERSONIC DIFFUSER

(75) Inventor: Hermann W. Behrens, Rancho Palos Verdes, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/585,209

(22) Filed: Jun. 1, 2000

(51) Int. Cl.[7] .................................................... F16K 49/00

(52) U.S. Cl. .......................... 137/338; 137/561; 239/500; 239/502; 239/590.5

(58) Field of Search .................................... 239/500, 502, 239/590.5; 137/561 A, 338

(56) References Cited

U.S. PATENT DOCUMENTS 3,998,393 * 12/1976 Petty ................................ 239/553.5
4,909,914 * 3/1990 Chiba et al. ......................... 204/164
4,911,805 * 3/1990 Ando et al. .
5,735,469 4/1998 Rodriguez et al. .
6,098,897 * 8/2000 Lockwood ............................... 239/8

* cited by examiner

*Primary Examiner*—A. Michael Chambers
*Assistant Examiner*—Thomas L. McShane

(57) ABSTRACT

A gas flow device including a compact supersonic diffuser for converting high-velocity low-pressure gaseous flow to low-velocity high-pressure gaseous flow. The compact supersonic diffuser includes a plurality of wedges disposed in the diffuser duct that, by selectively initiating a series of interacting shocks on the gaseous flow, convert the flow to lower velocities and higher pressures in a shorter path.

10 Claims, 4 Drawing Sheets

Section A-A

SUPERSONIC GAS FLOW DEVICE INCORPORATING A COMPACT SUPERSONIC DIFFUSER

BACKGROUND OF THE INVENTION

1. Field of the Invention

The present invention relates generally to supersonic gas flow devices, and more specifically to short length, low weight and volume supersonic diffusers suitable for converting low-pressure supersonic gaseous flows to high-pressure subsonic gaseous flows in such devices.

2. Description of the Prior Art

In mobile chemical laser systems, the gas providing optical amplification is usually flowing at a supersonic velocity. Supersonic diffusers are used to convert the low-pressure and high-velocity gaseous flow (supersonic flow) to a high-pressure and low-velocity gaseous flow (subsonic flow). The primary function of the diffuser is to decelerate the gaseous flow from a maximum velocity to a much lower velocity, and to recover as much as possible of the flow's original kinetic energy in the form of increased pressure. The flow mechanism most typically relied upon is the normal shock structure that requires a duct length on the order of 10 duct heights to facilitate a gradual flow deceleration and associated pressure increase without causing large energy losses and flow unsteadiness. Generally, the normal shock is generated when the supersonic flow existing outside a diffuser wall boundary layer, shocks the downstream flow from supersonic to subsonic. Because the boundary layers cannot withstand the attendant large pressure rise which causes them to separate from the diffuser wall, an effective expanding flow channel having a supersonic core flow region results.

Because mobile gas laser systems must be transportable, diffuser designs for such systems must have the shortest length, and lowest weight and volume possible without compromising the diffuser's pressure recovery abilities.

What is needed therefore is a system that includes a compact supersonic diffuser having increased pressure recovery capabilities and reduced length, weight, and volume.

SUMMARY OF THE INVENTION

The preceding and other shortcomings of the prior art are addressed and overcome by the present invention which provides, in a first aspect, a gas flow device including an inlet section providing a channel for a supersonic gaseous flow, a flow of supersonic gas through the channel, and a diffuser means for receiving the supersonic flow from the channel and converting the supersonic gas flow from a low-pressure and high-velocity flow to a high-pressure and low-velocity gas flow utilizing a series of interacting shocks.

BRIEF DESCRIPTION OF THE DRAWINGS

Reference is now made to the following specification and attached drawings, wherein.

DETAILED DESCRIPTION OF THE INVENTION

Figure 1:
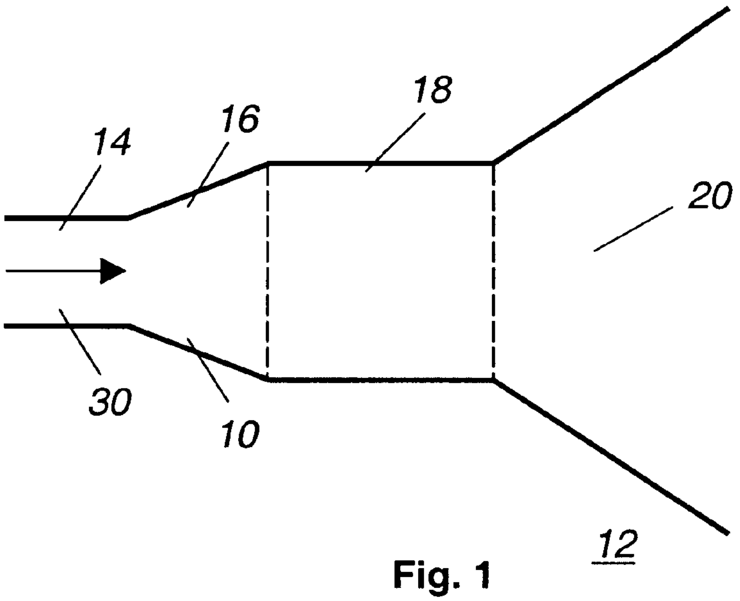
FIG. 1 is a side perspective view of a supersonic gas flow device in accordance with a preferred embodiment of the present invention.

Referring to FIG. 1, a supersonic gas flow device 12 is illustrated. Although the flow device 12 illustrated in FIG. 1 is a supersonic gas flow device for use in laser systems, the principles of the present invention may also be practiced in wind tunnel systems, ram jet engines, or any other system that includes a gaseous supersonic flow. The supersonic laser flow device 12 includes an inlet section 14, a lasing section 16, a first diffuser section 18, and a second diffuser section 20.

A supersonic flow of lasing gas 30 from nozzles (not shown) located in the inlet section 14 of the flow device 12 moves in a downstream direction entering a lasing cavity 10 of the lasing section 16. The gas flow 30 from the lasing cavity 10 flows through the first diffuser section 18 where it is transitioned from a supersonic velocity and low-pressure to a subsonic velocity and high-pressure. Immediately downstream of the first diffuser section 18 is the second diffuser section 20 where the subsonic gas flow from the first diffuser section 18 is further decelerated.

Figure 2:
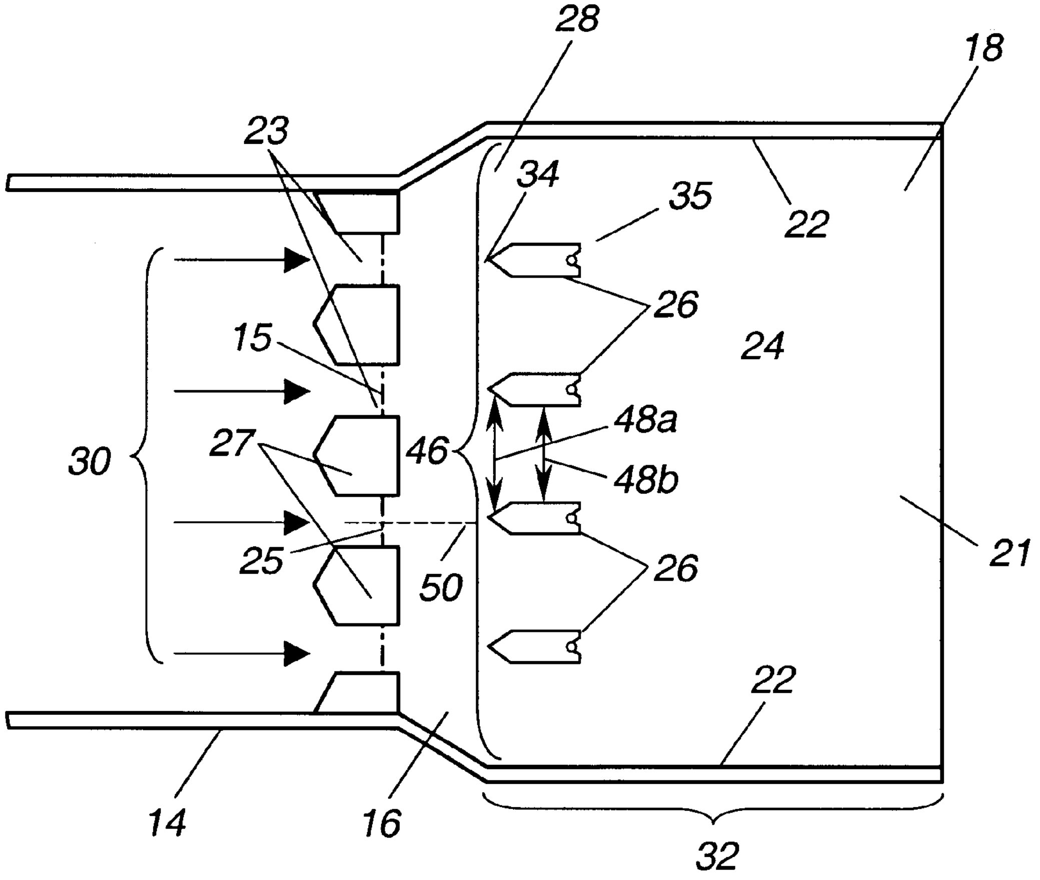
FIG. 2 is a top cross-sectional view of a supersonic diffuser in accordance with a preferred embodiment of the present invention.

Referring to FIG. 2, the inlet section 14 includes a plurality of nozzles 23 for supplying the supersonic flow 30 to the first diffuser section 18. Each nozzle 23 has an opening 25 centered about an axis 50. Each nozzle 23 is spaced from each other nozzle 23 along a central axis 15 normal to the downstream direction of the gas flow 30 and each pair of adjacent nozzles 23 is separated by a base region 27. The velocity of the supersonic gas flow 30 immediately downstream from each base region 27 is slower compared to the velocity of the supersonic flow 30 in the vicinity immediately downstream from each nozzle center axis 50. For most chemical laser systems, including hydrogen fluoride (HF), deuterium fluoride (DF) or chemical oxygen iodine laser (COIL), the array of nozzles 23 serve as injectors of the necessary lasing gas cavity flows.

The first diffuser section 18 is bounded by a top wall (not shown) and bottom wall 21 that are normal to side walls 22 and includes a longitudinal dimension 32 that is a shorter path than that typically found in conventional supersonic diffusers. The preferred embodiment of the present invention has a first diffuser section 18 having a duct height ratio of from approximately 1:1 to 2:1. The duct height ratio is defined as the ratio between the duct section longitudinal dimension 32 and a duct section latitudinal dimension that is normal to the dimension 32 and extends from the top diffuser wall (not shown) to the bottom diffuser wall 21. This duct height ratio is small compared to the duct height ratios of conventional diffusers that typically have duct height ratios of approximately 10:1.

To obtain efficient pressure recovery in a shorter path, the first diffuser section 18 includes a plurality of wedges 26 that are attached to the top (not shown) and bottom wall 21 of the diffuser section 18. The wedges 26, having an angular end 34 and a base end 35 opposite the angular end 34, are disposed axially in a plane generally normal to the supersonic flow 30 and downstream from the array of laser nozzles 23 with each wedge angular end 34 facing upstream. As previously described, the velocity of the flow 30 coming from the array of nozzles 23 is highest directly downstream from each chemical laser nozzle centerline 50, as compared to the speed of the flow 30 directly downstream from the base regions 27, so each wedge 26 is placed in a downstream path, aligned with the center axis 50 of a corresponding laser nozzle 23.

Figure 3:
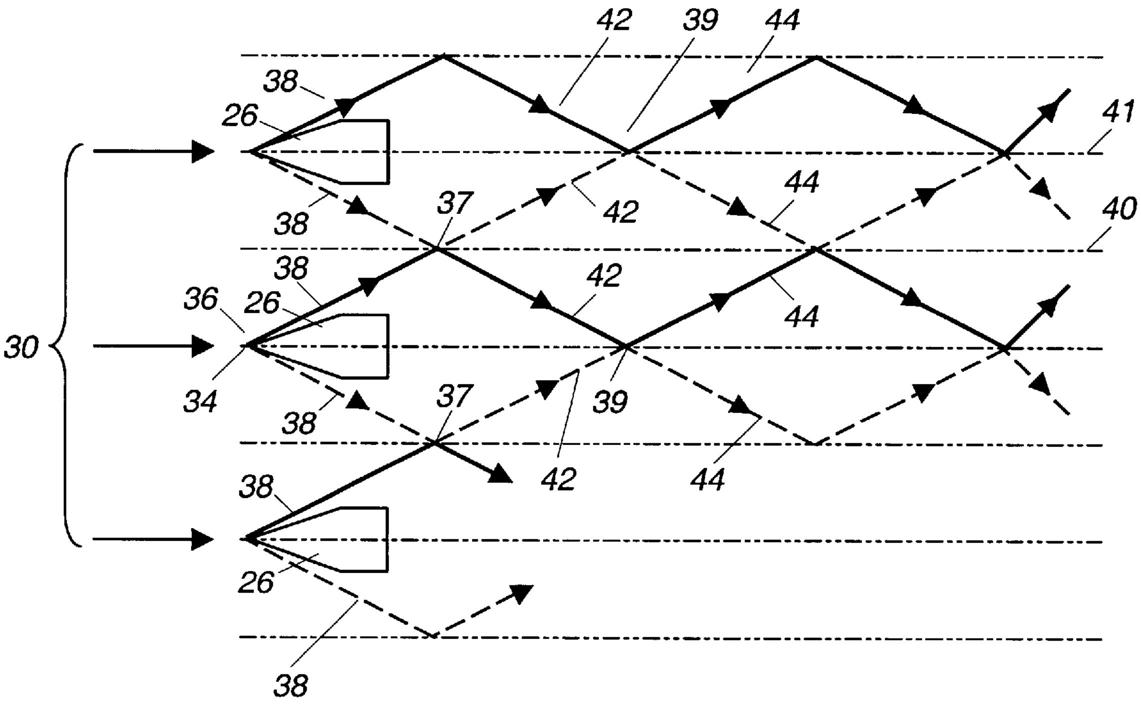
FIG. 3 is a top cross-sectional view of the supersonic diffuser and shock interactions initiated by wedges therein in accordance with the preferred embodiment of the present invention.

Referring to FIG. 3, the supersonic gas flow 30 travels in a downstream direction towards a wedge 26. Upon making contact with the angular end 34 of the wedge 26, the flow 30 is reflected at the apex 36 of the angular wedge end 34. Each wedge angular end 34 functions as an oblique shock initiator against the gas flow 30. The flow 30, by reflecting at the apex 36, generates a plurality of oblique shock waves (illustrated as lines 38) that produce an attendant increase in gas flow pressure and decrease in gas flow velocity.

A second plurality of oblique shock waves, illustrated as the lines 42, are generated when the initial oblique shock waves 38 of adjacent wedges 26 collide with each other, such as at a point 37 located on a centerline 40 between wedges 26, and reflect away from each other. The second plurality of oblique shock waves 42 act to further increase the flow pressure and correspondingly decrease the flow speed.

A third plurality of shock waves, illustrated as the lines 44, may likewise be generated when the second plurality of oblique waves 42 collide and reflect away from each other at a point 39 in the manner previously described. These shock waves 44 may be an oblique shock or a much weaker normal shock, depending on the Mach number of the supersonic flow which causes the gas flow 30 to become subsonic.

By following the gas flow 30 further downstream, additional series of shock waves may be generated until the gas flow 30 transitions from a high-velocity and low-pressure supersonic flow to a lower-velocity and higher-pressure subsonic flow. By disposing the angular ends of 34 of the wedges 26 directly downstream from the highest velocity regions of the gas flow 30 and utilizing the angular ends 34 as shock initiators, the plurality of interacting shock waves (38, 42, 44) effect the transition of the gas flow 30 to subsonic velocities in a shorter duct length.

Figure 4A:
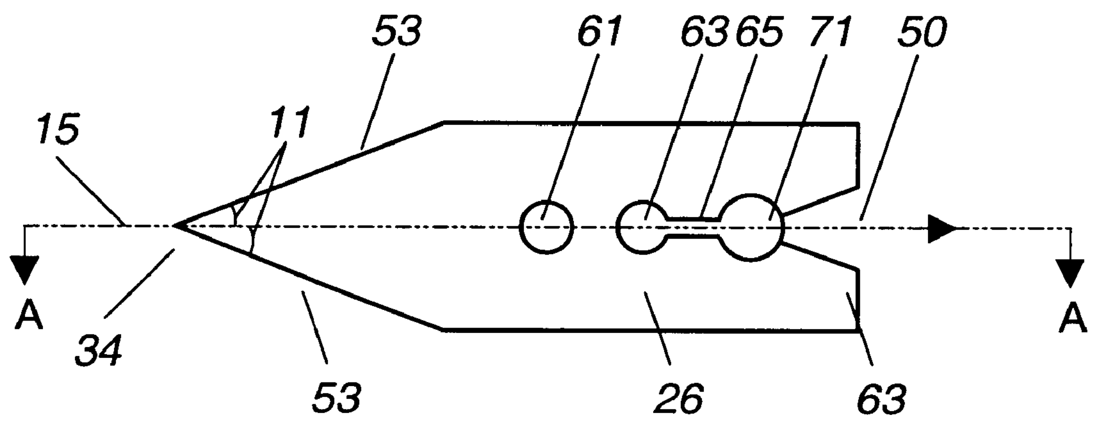
FIG. 4*a* is a top perspective view of the wedge used in the present invention.

Referring now to FIG. 4, the dimensions of the wedges 26 and their placement within the diffuser duct 18 are designed so that there is no excessive contraction, during shock wave initiation, of the supersonic gas flow 30 for a particular Mach number upstream of each wedge 26. If excessive contraction of the gas flow occurs, the diffuser will "unstart" and the oblique shock waves (38, 42, 44) will not form about the wedges 26. An "unstart" condition is characterized by the gas flow 30 becoming subsonic in the lasing cavity 10 at which point the lasing action ceases.

The preferred wedge 26 dimensions include complementary six (6) degree to ten (10) degree one-half angles 11 (measured from a center axis 15) to form the angular end 34 of the wedge 26. To achieve lasing in the lasing cavity 10, the gas flow 30 must be supersonic at the angular end 34 of the wedges 26. To produce an oblique shock at the apex 36 of the wedge 26, the contraction ratio (see FIG. 2), which is the ratio of the cross-sectional area 48*a* that the gas flow 30 sees upstream of the wedges 26 and the area 48*b* between the wedges 26 at their largest cross-section, must be such that the supersonic gas flowing 30 about the wedges 26 at the angular end 34 is supersonic. In other words, the contraction ratio should be less than the contraction ratio required for the supersonic flow 30 to become sonic. For example, a supersonic flow of Mach number 2 must have a contraction ratio significantly less than 1.6 to produce an oblique shock at the angular end 34.

Figure 4B:
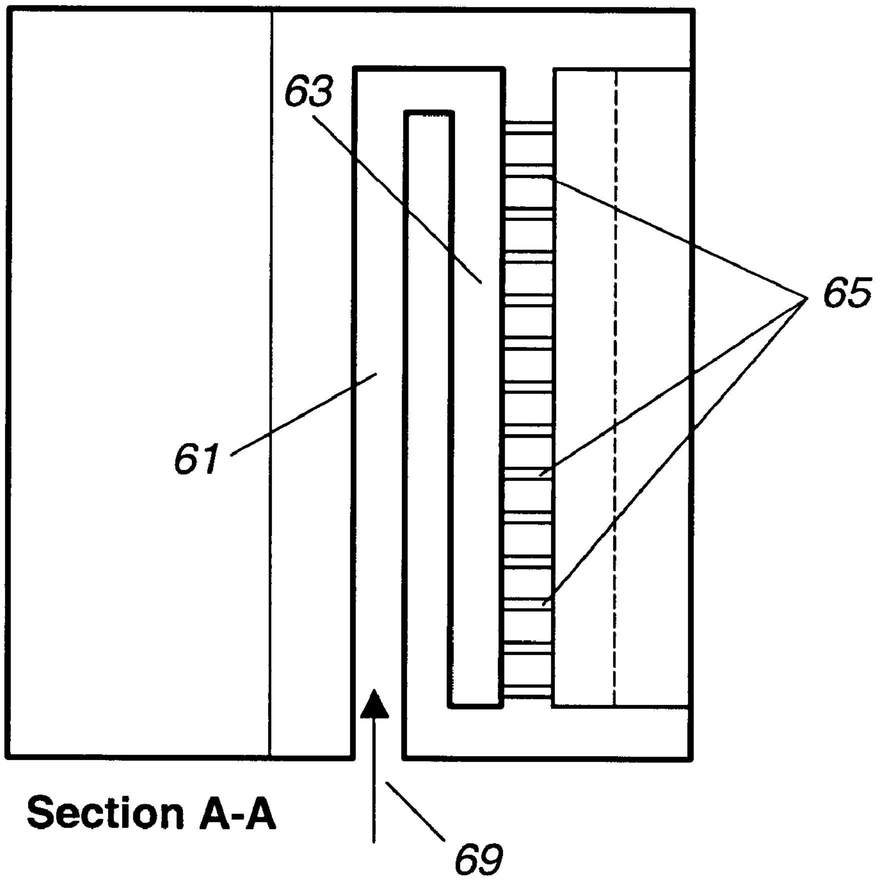
FIG. 4*b* is a side perspective view of the wedge illustrated in FIG. 4*a*.

As illustrated in FIG. 4, the wedges 26 may optionally be cooled. Cooling the wedges 26 may be particularly important in certain laser applications, for example hydrogen fluoride (HF) or deuterium fluoride (DF) lasers, because the stagnation temperature of the flow 30 around the edges 53 of the wedges 26 is particularly high causing the edges 53 to become very hot. The wedges 26 are cooled by flowing a fluid through circular cooling channels (61, 63) located within the wedge 26 and, ejecting a portion of the flow 30 out a supersonic nozzle 50 attached at the base end 63 of the wedge 26. More particularly, the cooling fluid is input, as shown by numeral 69 in FIG. 4*b*, into the first cooling channel 61 where it flows along the first channel 61 and then returns into the second channel 63. In the second cooling channel 63 there are a plurality of elements, metering orifices 65, that meter the flow 30 out into the plenum 71 of the supersonic nozzle 50 at the base end 63 of the wedge 26. In addition to cooling the wedges 26, a further benefit is achieved when the lower flow, located immediately upstream from the wedge 26, is energized as the flow is ejected from the supersonic nozzle 50 during the cooling of the wedges 26. The total effect of energizing the slower flow is to obtain a cross-sectional flow having generally constant speed and pressure which in turn enhances the pressure recovery of the diffuser 18.

As previously mentioned, the primary purpose of the first diffuser section 18 is to decelerate the gas flow 30 from its maximum velocity to a lower velocity. In conventional diffusers, this deceleration and associated pressure increase occurs gradually along a long constant area diffuser duct to prevent flow unsteadiness known as "boundary layer separation." Therefore, to achieve optimal pressure recovery in the shorter length diffuser 18, it may be necessary to mitigate any boundary layer separation effects the shock waves (38, 42, 44) may have on the top and bottom diffuser walls 21 and the side diffuser walls 22.

Figure 5:
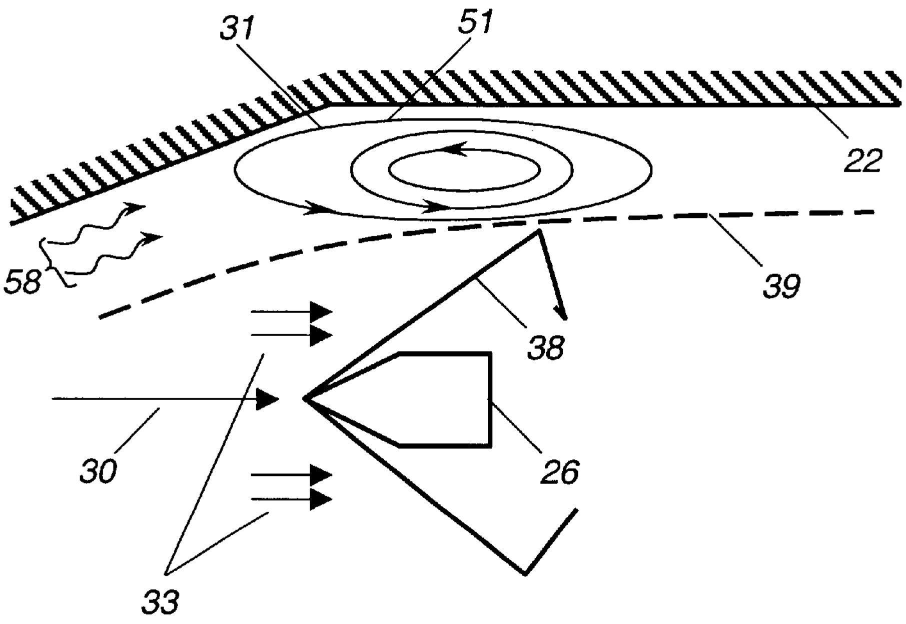
FIG. 5 is a top cross-sectional view of the supersonic diffuser showing the boundary layer separation effects therein.

For example, as illustrated in FIG. 5, the gas 58 flowing in the region 31 along the side wall 22 of the diffuser duct 18 is characteristically slow moving relative to the free stream gas flow 33. This low velocity (subsonic) flow region 31 is contained within a boundary layer 39 along the inner wall 22. The presence of the oblique shock wave 38 within the low speed flow region 31 causes such flow 58 to "separate" from the wall 22 creating what is known as boundary layer separation. In other words, boundary layer separation occurs when a portion of the higher pressure gas flow 51 that is being felt upstream in the lasing cavity 10 reverses direction to create a flow separation re-circulation region 31 at the wall 22. Such reverse gas flow 51 displaces the incoming supersonic gas 58 flow away from the wall 22 and contracts the supersonic gas flow 58. The boundary layer separation is accompanied by an upstream (reverse) propagation of a high-pressure flow 51, downstream of the shock 38 wave, that flows against the free stream gas flow 33. This reverse propagation of the high-pressure flow 51 is undesirable (e.g. detrimental to efficient lasing) and must be eliminated or its effect on the diffuser 18 performance negated.

Figure 6:
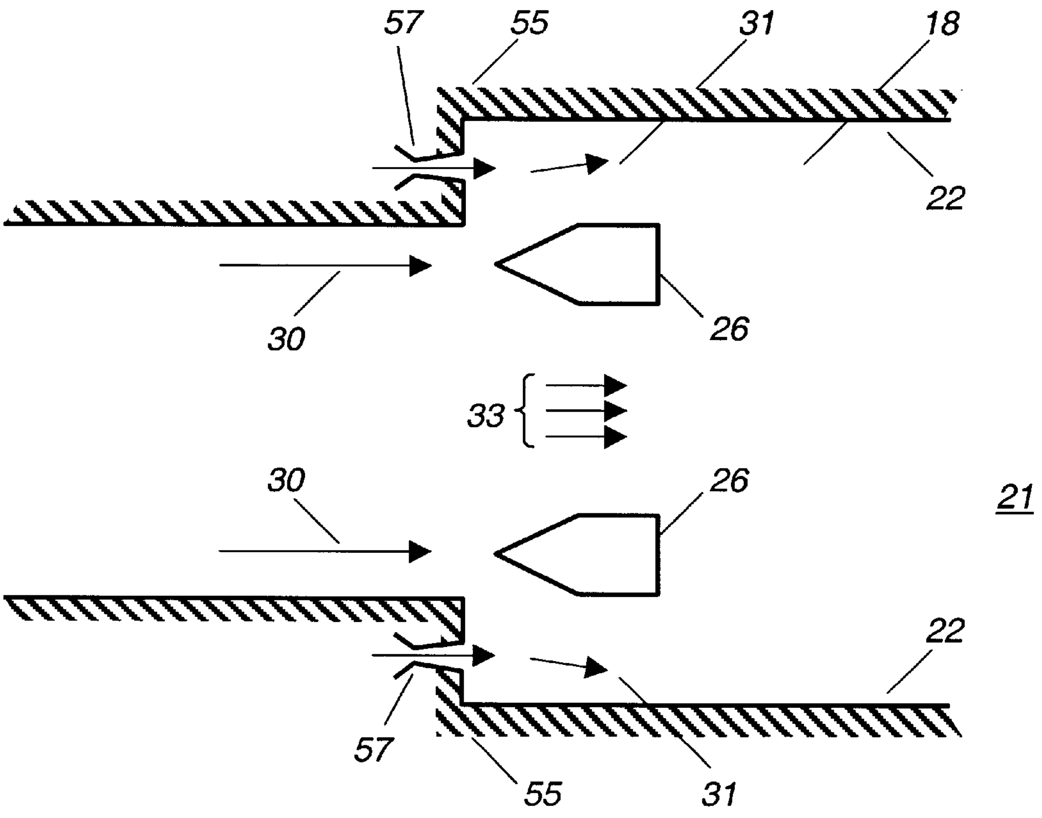
FIG. 6 is a top cross-sectional view showing boundary layer energization in the diffuser of the present invention.

Referring to FIG. 6, the undesired effects of the shock wave 38 within the low speed gas flow regions 31 adjacent to the diffuser side walls 22 and top and bottom walls 21 may be mitigated using boundary layer energization. Energizing the boundary layers may occur by selectively locating downstream facing steps 55 along the inner wall 22 of the diffuser section 18 at the upstream end of the diffuser 18 and upstream from the array of wedges 26. Inserting individual supersonic nozzles 57 in each step 55 energizes the low speed gas flow regions 31 downstream from each step 55 and forces any reverse high-pressure gas flow 51 (see FIG. 5) created as a result of boundary layer separation in a preferred downstream direction. The gas flowing through each nozzle 57 may be any inert (non-reactive) gas such as helium or nitrogen, and is input to the nozzle from a reservoir (not shown) located outside the diffuser device 12. Alternatively, before the gas is expelled through the supersonic nozzles 57, it can pass through channels similar to the double pass cooling channels (61, 63) illustrated in FIG. 4.

Generally, the desired effect of boundary layer energization is that the momentum of the gas flowing 58 inside the boundary layer, with energization, is at least the same as the momentum of the free stream gas 33 flowing outside the boundary layer 39. Although the preferred method for mitigating boundary layer separation is boundary layer energization, the present invention may include alternative methods that include, but are not limited to, boundary layer suction.

Obviously, many modifications and variations of the present invention are possible in light of the above teachings. Thus, it is to be understood that, within the scope of the appended claims, the invention may be practiced otherwise than as specifically described above.

What is claimed is:

1. A flow device comprising:

an inlet section for providing a channel for a supersonic flow of gas;

means for supplying said supersonic flow through said channel; and a first diffuser section for transitioning said supersonic gas flow to a subsonic gas flow, said first diffuser section disposed downstream from said inlet section and forming a duct having an inner wall; and a plurality of wedges disposed axially inside said first diffuser section along a plane generally normal to a downstream flow path formed by said supersonic gas flow, said plurality of wedges inducing a series of interacting shock waves from said supersonic gas flow to transition said supersonic gas flow to said subsonic gas flow, each said wedge having an angular end, a base end opposite said angular end, each said angular end positioned facing upstream.

2. A supersonic gas flow device as recited in claim 1, further comprising:

a lasing section for receiving said supersonic flow in a lasing cavity, said lasing section disposed between said inlet section and said first diffuser section.

3. A flow device comprising:

an inlet section for providing a channel for a supersonic flow of gas;

means for supplying said supersonic flow through said channel;

a first diffuser section for transitioning said supersonic gas flow to a subsonic gas flow, said first diffuser section disposed downstream from said inlet section and forming a duct having an inner wall;

a plurality of wedges disposed axially inside said first diffuser section along a plane generally normal to a downstream flow path formed by said supersonic gas flow, said plurality of wedges inducing a series of interacting shock waves from said supersonic gas flow to transition said supersonic gas flow to said subsonic gas flow, each said wedge having an angular end, a base end opposite said angular end, each said angular end positioned facing upstream; and a second diffuser section disposed downstream from said first diffuser section for transitioning said subsonic gas flow to a decelerated gas flow.

4. A gas flow device as recited in claim 1, wherein said means for supplying said supersonic flow through said channel further comprises:

a plurality of nozzles disposed in said inlet section spaced from each other said nozzle along a central axis wherein each pair of adjacent nozzles is separated by a base region, each nozzle having an opening facing a downstream direction.

5. A flow device comprising:

an inlet section for providing a channel for a supersonic flow of gas;

means for supplying said supersonic flow through said channel;

a first diffuser section for transitioning said supersonic gas flow to a subsonic gas flow, said first diffuser section disposed downstream from said inlet section and forming a duct having an inner wall; and a plurality of wedges disposed axially inside said first diffuser section along a plane generally normal to a downstream flow path formed by said supersonic gas flow, said plurality of wedges inducing a series of interacting shock waves from said supersonic gas flow to transition said supersonic gas flow to said subsonic gas flow, each said wedge having an angular end, a base end opposite said angular end, each said angular end positioned facing upstream, said series of interacting shock waves comprising:

a first plurality of oblique shock waves generated from redirecting said supersonic flow at each said wedge angular end; and a second plurality of oblique shock waves generated from said first plurality of oblique shock waves reflecting from each other.

6. A gas flow device as recited in claim 1, further comprising:

means for preventing boundary layer separation along said inner wall.

7. A flow device comprising:

an inlet section for providing a channel for a supersonic flow of gas;

means for supplying said supersonic flow through said channel;

a first diffuser section for transitioning said supersonic gas flow to a subsonic gas flow, said first diffuser section disposed downstream from said inlet section and forming a duct having an inner wall;

a plurality of wedges disposed axially inside said first diffuser section along a plane generally normal to a downstream flow path formed by said supersonic gas flow, said plurality of wedges inducing a series of interacting shock waves from said supersonic gas flow to transition said supersonic gas flow to said subsonic gas flow, each said wedge having an angular end, a base end opposite said angular end, each said angular end positioned facing upstream; and means for preventing boundary layer separation along said inner wall, said means for preventing boundary layer separation along said inner walls comprising:

a plurality of downstream facing steps formed on said inner walls at an upstream end of said first diffuser section; and means for energizing a gas flow located along said inner walls.

8. A gas flow device as recited in claim 7, wherein said means for energizing said supersonic gas flow comprises:

a plurality of supersonic nozzles, each one of said supersonic nozzles disposed within one said corresponding downstream facing step for forcing said supersonic gas flow in a downstream direction.

9. A gas flow device as recited in claim 1, further comprising means for cooling each said wedge.

10. A flow device comprising:

an inlet section for providing a channel for a supersonic flow of gas;

means for supplying said supersonic flow through said channel;

a first diffuser section for transitioning said supersonic gas flow to a subsonic gas flow, said first diffuser section disposed downstream from said inlet section and forming a duct having an inner wall;

a plurality of wedges disposed axially inside said first diffuser section along a plane generally normal to a downstream flow path formed by said supersonic gas flow, said plurality of wedges inducing a series of interacting shock waves from said supersonic gas flow to transition said supersonic gas flow to said subsonic gas flow, each said wedge having an angular end, a base end opposite said angular end, each said angular end positioned facing upstream; and means for cooling each said wedge, said means for cooling each said wedge comprising:

a first cooling channel formed within said wedge;

a second cooling channel formed within said wedge, wherein said second cooling channel being connected to said first cooling channel;

a fluid provided for flowing through said first cooling channel into said second cooling channel to cool said wedge; and a plurality of elements formed within said second cooling channel, said plurality of elements having means for metering the flow of said fluid within said second cooling channel.

* * * * *